Figure 1:
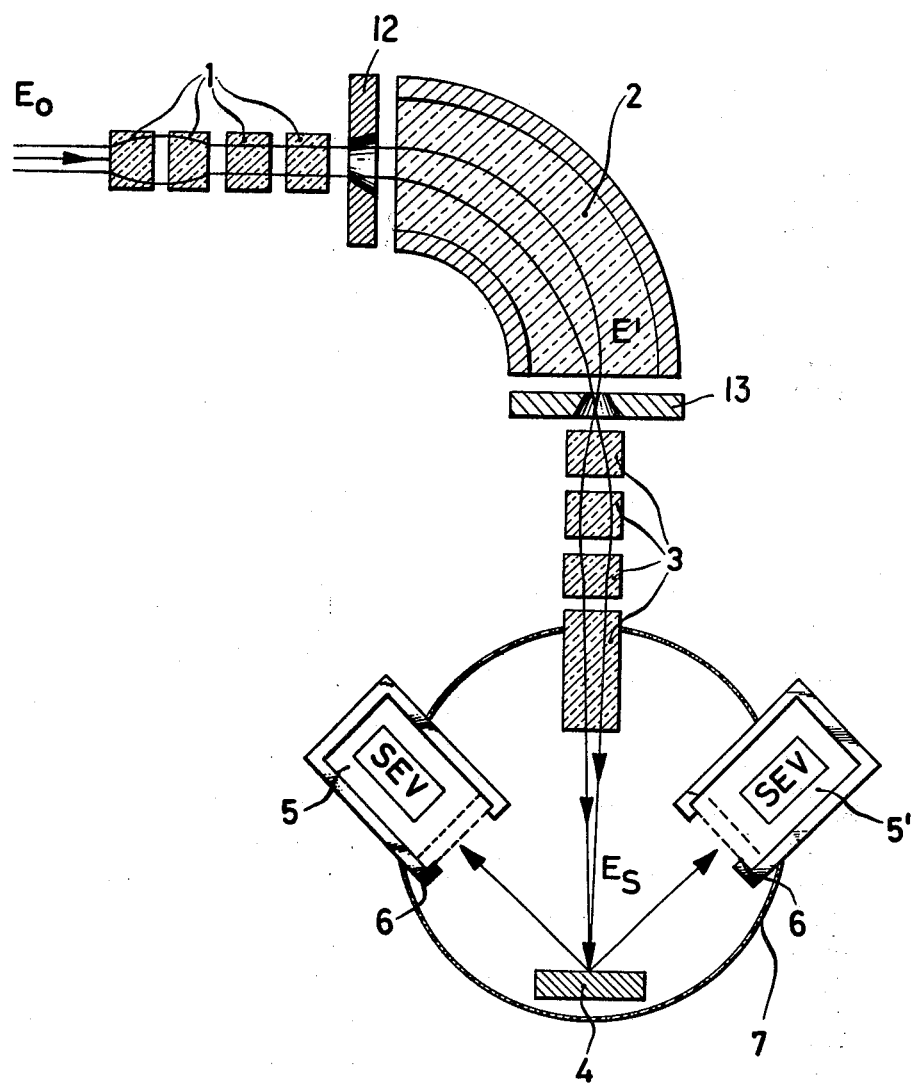

United States Patent [19]

Kirschner

[11] 4,153,844
[45] May 8, 1979

[54] MEASURING APPARATUS FOR DEGREE OF SPIN POLARIZATION OF AN ELECTRON BEAM

[75] Inventor: Jürgen Kirschner, Aachen, Fed. Rep. of Germany

[73] Assignee: Kernforschungsanlage Jülich Gesellschaft mit beschränkter Haftung, Jülich, Fed. Rep. of Germany

[21] Appl. No.: 841,711

[22] Filed: Oct. 13, 1977

[30] Foreign Application Priority Data

Oct. 14, 1976 [DE] Fed. Rep. of Germany ....... 2646394

[51] Int. Cl.² ............................................. G21K 1/10
[52] U.S. Cl. ................................ 250/492 R; 324/71 E
[58] Field of Search ............... 250/305, 306, 309, 310, 250/396 R, 397, 398, 492 R; 313/359, 361; 324/71 E

[56] References Cited

U.S. PATENT DOCUMENTS

| | | | |
|---|---|---|---|
| 2,260,041 | 10/1941 | Mahl et al. | 250/398 |
| 3,287,558 | 11/1966 | Bly et al. | 250/305 |
| 3,445,708 | 5/1969 | Webster | 250/305 |
| 3,935,454 | 1/1976 | Lee | 250/306 |

Primary Examiner—Bruce C. Anderson
Attorney, Agent, or Firm—Flynn & Frishauf

[57] ABSTRACT

An electron beam is monochromatized, brought to an appropriate energy level, by acceleration or slowing down, and focussed on a monocrystal electron scattering surface. Backscattered electrons are measured at complementary scattering angles, but only after slow electrons are separated or trapped that result from inelastic interaction with the crystal. The response of the detectors of a pair, in pulse count or current flow, allows the degree of spin polarization P to be calculated by $$P = f \times (I_1 - I_2)/I_1 + I_2).$$

6 Claims, 2 Drawing Figures

MEASURING APPARATUS FOR DEGREE OF SPIN POLARIZATION OF AN ELECTRON BEAM

This invention relates to apparatus for determining the degree of spin polarization of an electron beam by the backscattering of electrons by a crystal having a surface perpendicular to the beam direction which surface is formed in a plane of the crystal structure chosen for the scattering of electrons. In such equipment, the backscattering is measured by devices provided to respond to the intensity of electrons backscattered by the monocrystal at respectively complementary angles to the electron beam direction.

BACKGROUND AND PRIOR ART

An electron may have not only energy and momentum, but also spin. The direction of spin relative to a specified direction represents an important piece of information that can be determined by means of the interaction of the electron with other particles, for example with atoms in a surface layer of a solid. For carrying out such an investigation, apparatus for measuring the degree of spin polarization of electron beams is necessary. Such equipment is already known that operates on the basis of the dependence upon the electron spin of the scattering of electrons by free atoms, the so-called Mott scattering. In such equipment, determination of the degree of polarization of the incident electron beams is made from the comparison of intensity measurements at scattering angles that are equal in amount but of opposite sign. There is a disadvantage in this case, however, that appreciable intensity differences resulting from the electron spin direction occur only at low overall intensity. The sensitivity of the known equipment is therefore very limited. This is all the more significant a disadvantage, because strong polarization effects are limited to only small scattering angle ranges. That has the consequence that only a very small part ($\lesssim 10^{-4}$) of the aggregate quantity of scattered electrons can be used for measurement.

The known measuring equipments for this purpose are based on the application of two different methods. In the first method, an atom beam, preferably of Hg, is used, against which the electrons are scattered with a few keV of energy. Since it is difficult, however, to produce atom rays in high density, difficulties occur in this kind of method regarding the intensity of the radiation. In the second method, thin foils are used for scattering the electrons. In this case, however, with the advantage of high atom density, there is the unavoidable disadvantage of multiple scattering of the electrons and their absorption in the foil. In order to cope with these difficulties, the measurement has therefore been carried out with electrons accelerated to high energy (100 to 150 keV). In that case, there is still the disadvantage that the effective cross-section for the scattering is very small and therefore only a small scattering intensity and measurement sensitivity is obtained. The application of high electric voltages, in addition, makes the known equipment very large and cumbersome on account of the necessary safety precautions.

It has therefore already been recommended that the degree of polarization of an electron beam should be measured by means of the spin-dependent intensity of an electron beam specularly reflected by the surface lattice of a monocrystal. The differential effective cross-section for the refraction of slow electrons dependent upon the orientation of the electron beam is in this case higher by several orders of magnitude than in the case of the Mott scattering. The sensitivity is also correspondingly higher. Since in the case of the measurement of the degree of polarization the scattering must always be carried out at two complementary and as nearly as equal as possible angles in the incidence plane of the beam, it has been favored to measure the two scatter beams by tipping the crystal alternately by equal angles, first to one and then to the other side, and measuring the scatter intensity after each change (see in this regard R. Feder, Surf. Sci. 51, 297, 1975). Much time and expense, and therefore disadvantage, is involved, however, because the mechanical movement of the crystal must be carried out with high precision and reproducibility, very often, and with sufficient rapidity and, moreover, in ultrahigh vacuum ($10^{-11}$ mbar). The time consumption required for carrying out such a double measurement is more than twice as high as required for a single measurement.

THE PRESENT INVENTION

It is an object of the present invention to provide equipment for measuring the degree of spin polarization of an electron beam with higher sensitivity than the equipment heretofore known and that permits, moreover, measurement with an electron beam independent of the primary energy of the electrons and measurement that can be carried out quickly with high accuracy and with equipment that lends itself to compact construction.

Briefly, the electron beam is first passed through means for accelerating or decelerating the electrons constituted of electrostatic or magnetic lenses of respectively tubular or diaphragm form. Such devices are known as lenses because they have a focussing effect on the electrons, and a d.c. voltage is supplied so that they at the same time will accelerate or slow down the electrons of the beam, as the case may be. In this case the device adjusts the electron velocity to suit the function of a monochromator through which the beam next passes for the function of reducing the energy scatter of the electrons to an extent suitable for the measurement, after which the electron beam is then again accelerated or decelerated by electrostatic or electromagnetic lenses and, at the same time, focussed on the surface of the monocrystal oriented as already above mentioned. The second velocity adjustment is made to optimize backscatter measurement by the particular monocrystal reflection. The intensity of electrons backscattered by the monocrystal is measured by means comprising at least two detectors provided for measuring the intensity of electrons backscattered from the surface of the monocrystal at complementary angles, and between the measuring or detecting means and the surface of the monocrystal means are provided for separating or deviating the low-energy portion of the electrons that is backscattered by inelastic interaction with the monocrystal. In one embodiment, this is done by the formation of an opposing counter electric field and in another embodiment, this is done by providing an electrostatic or magnetic field for deviating the slow electrons in front of each of the detectors.

The measuring arrangement preferably uses adjustable detectors arranged in pairs in planes that are as far as possible perpendicular to each other and intersecting in the direction of the incident electron beam. It is convenient to provide the measuring means in the form of collector plates distributed in the hemispherical space above the monocrystal facing the incident beam, and preferably electron multiplier channel plates are provided in front of the respective collector plates.

The first velocity-adjusting electron lens system is so designed that when the electron beam has passed through the monochromator and the second electron lens system and is incident on the monocrystal, it will have exactly the energy scatter $\Delta E$, which is tolerable for the scattering process at the monocrystal surface. The permissible energy scatter $\Delta E$ lies in the range between 0.7 and 5 eV.

The acceleration of deceleration of the electrons in the first electron lens system makes it possible, in combination with the monochromator and the second velocity-adjusting electron lens system, the setting of the desired energy level designed for the scattering of the electrons at the monocrystal surface such that in addition to the specularly reflected scatter beam, corresponding to the Bragg scatter condition, there arise also scatter beams of higher orders having an angle to the normal that is sufficiently large to make possible detection of the scatter beam by the detectors and exhibiting strong polarization effects at an intensity that is as high as possible. The desired energy level in practice is in the range between 10 and 300 eV, according to the selection of the monocrystal, preferably however about 100 eV. The monochromator operating as an energy filter separates out the electrons that differ by more than the predetermined energy amount from the mean energy. The influence of the deflecting field on the orientation of the polarization vector of the electron beam is negligible. In the scattering of electrons by the monocrystal, the influence of the transversal components of the electron spin on the scattering of the electrons is measured. For the case in which the electrons in the primary beam already are transversally aligned to the beam direction, no further treatment is necessary. For the case in which the electrons in the primary beam are aligned longitudinally, the monochromator is so designed that the electron beam is deflected through an angle of 90°. The electron spin previously aligned longitudinally in the primary beam is then aligned transversally in the resulting beam.

In the second lens system for accelerating or decelerating the electrons, the electrons are brought to the energy level required or designed for the scattering by the crystal lattice. The electrons impinge with this energy on the monocrystal, which so far as possible, consists of a material having heavy atoms, such as tungsten, gold or platinum.

An advantageous further development of the apparatus of the invention consists in constituting the arrangement for measuring the backscatter intensity of four adjustable detectors of backscattered electron beams, disposed in pairs in two planes that are so far as possible perpendicular to each other and that intersect each other in a line having the direction of the incident electron beam. The result is thereby obtained that the transversal polarization vector of the incident beam is then fully determined, even if it is not exactly perpendicular to the plane that is determined by the normals to the crystal surface and the line connecting two detectors of a pair that intersects them. The detectors can, for example, consist of so-called channeltrons. A tungsten monocrystal that has scattering planes that are perpendicular to each other is, for example, usable as the monocrystal for measurements carried out in this manner.

A further feature of the apparatus of the invention is the arrangement of the backscattering intensity measuring devices as collector plates in the hemispherical space above the monocrystal facing the incident electron beam. The size of the plates is so determined that a refraction beam or a portion thereof is detected by each collector. This advantageous arrangement of the detectors dispenses with the adjustment of detectors for the measurement of predicted backscattered electron beams, since all of the backscattered electrons in the entire hemispherical space will be detected by the collector plates, and it is merely necessary to switch in for the measurement the collector plates corresponding to the backscattered beams as they are found or calculated. This arrangement also makes it unnecessary to readjust the position of the detectors when another monocrystal is selected. There is further the advantage that in carrying out the measurement, the symmetry of the apparatus can be checked by measuring beams that have no polarization effect.

A still further feature of the apparatus of the invention is the provision of electron multiplier channel plates ahead of the collector plates. The measurement is then performable with high accuracy, even for primary electron beams of relatively low intensity.

The provision of means for deviating or trapping a low-energy portion of the electrons produced by scattering at the monocrystal, in which there are provided above the crystal, one or more plane or curved grids next to each other, or one behind the other, with voltage applied either between the crystal and the grid or grids, or only between the grids, has the effect that only electrons with energy greater than a selected threshold energy pass through the grid. For the case in which individual detectors are used, the slow electron trapping system conveniently utilizes devices for producing an electrostatic or magnetic field disposed in front of the individual detectors. By a suitable choice of the field strength and the disposition of the deflection devices, the result is obtained that only electrons having an energy above a particular threshold energy reach the detector.

DRAWINGS, ILLUSTRATING EXAMPLES

Figure 3:
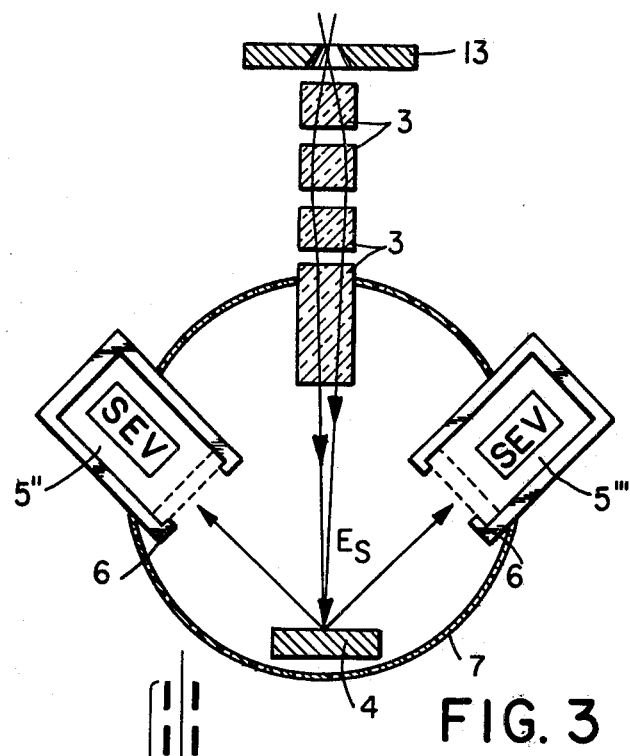
Figure 2:
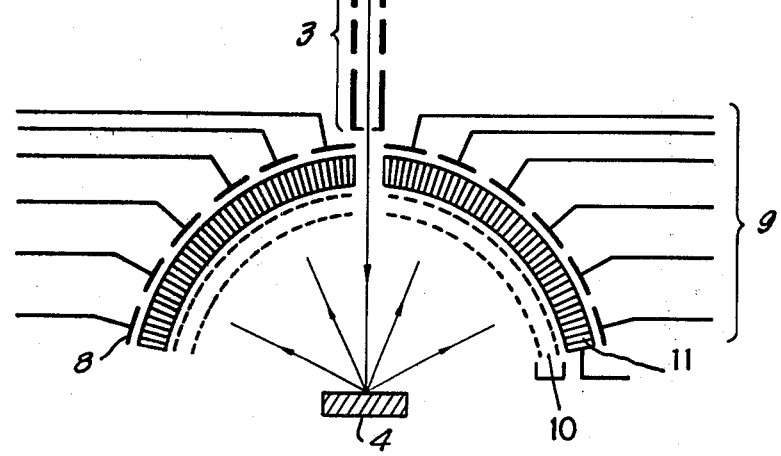

FIG. 1 is a diagram of an embodiment of the invention having separate backscattering intensity detectors; and FIG. 2 is a diagram of a portion of an embodiment showing the disposition of a backscattering system utilizing a multiplicity of collector plates, and FIG. 3 is a diagram of the lower portion of the embodiment of FIG. 1 in a view, mostly in a section through the line III—III of FIG. 1, at right angles to that shown in FIG. 1.

The apparatus shown in FIG. 1 is designed to operate on an incident electron beam 10 of electrons moving in parallel paths and having their spin longitudinally aligned. The electron beam passes into a cylindrical electron lens 1 consisting of four elements, in which the electrons are accelerated or decelerated from an initial energy $E_0$ to an energy $E'$ (the electron velocity being expressed in terms of energy in the usual way). The internal diameter of the cylindrical lens 1 is 30 mm. The lens is designed for a beam diameter of about 5 mm.

The axial electric fields produced between the successive elements of cylindrical lens are so dimensioned that the value of the energy $E'$ corresponds to the relation $$E' = R \times \Delta E$$

in which R is the relative resolution of the energy filter and ΔE is the energy range of the electrons that is acceptable for the subsequent scattering and scattering measurements.

Following the cylindrical lens system 1 is a spherical plate capacitor 2, having a mean radius of 10 cm. and a resolution capability of 5%, operating as an energy filter, in the electric field of which the electron beam is at the same time bent by 90°, so that the electrons leaving the spherical capacitor 2 have a spin that is aligned transversally. The spherical capacitor 2 is equipped with an input diaphragm 12 and an output diaphragm 13 necessary to produce the high resolution.

The beam leaving the output diaphragm 13 of the spherical capacitor 2 then passes through a second cylindrical lens system consisting of four elements, in this case having an internal diameter of 15 mm, in which the electrons are accelerated to the energy level previously determined to be suitable for scattering of the electrons by the particular crystal selected as the monocrystal of the device. The beam is at the same time focussed by the lens system 3 on the crystal, the crystal in the illustrated case being a tungsten monocrystal 4 presenting a (100) crystal plane in which the incident beam is focussed.

Among the several beams of the pattern produced at the monocrystal 4 by scattering, beams reflected at conjugated angles are picked up by secondary electron multipliers 5,5′ having a diameter of 1.5 cm and a length of 5 cm and the currents or pulses obtained in consequence are supplied to a measuring circuit not shown in the drawing. The two reflected rays reach the electron multiplier detectors 5 and 5′ in each case through a device consisting of two parallel grids 6 between which an electric field for slowing down or repelling electrons is applied, this device therefore operating as a high-pass electron velocity or electron energy filter. The grids are produced from metallic foils by photochemical treatment and have a transparency of more than 80%. By means of this device, the electrons coming out of the monocrystal surface as the result of inelastic interaction with the scattering centers on the surface are separated from the scattered beam. A fine mesh tungsten wire grid 7 having a transparency of 80% is provided for electrostatic shielding of the scattering region. The components 1 to 7 of the embodiment of the invention illustrated in FIG. 1 are enclosed in a cylindrical vacuum vessel having a diameter of 25 cm and a length of 40 cm. The pressure in the vacuum vessel is in the range of $10^{-11}$ mbar., in order that the crystal surface can be maintained in a clean condition over a long period.

The degree of polarization P of the incident beam is calculated by the following relation $$P = f \times (I_1 - I_2)/(I_1 + I_2)$$

in which $I_1$ and $I_2$ are the measurement magnitudes respectively determined by the detectors 5 and 5′ that can be count rates or current magnitudes, and in which f is a calibration factor.

FIG. 2 illustrates another embodiment mentioned above, in which a multiplicity of collector plates 8, having read-out wires 9, are arranged in the hemispherical space above the monocrystal 4, so that the measurement can be made with the particular pair of pairs of plates 8 that pick up the scattered beams chosen for measurement. In the hemispherical space above the monocrystal there are provided hemispherical concentric grids 10 for energy selection of scattered electrons, followed by a curved channel electron multiplier array 11.

FIG. 3 is a view of the portion of the apparatus of FIG. 1 including the diaphragm 13, the velocity-adjusting lens system 3, and the crystal 4 at right angles to the plane of FIG. 1 and through the axis of the lens system 3, showing the presence of an additional pair 5″ and 5‴ of detectors having their axes in a plane at right angles to the plane of the axes of the dectors 5 and 5′.

Although the invention has been described with reference to particular specific illustrative embodiments, variations are possible within the inventive concept. Thus, equivalent magnetic field producing means may be used instead of an electrostatic lens system for focusing the electrons in the components 1 and 3 of the apparatus and likewise a magnetic field can be used instead of the spherical capacitor 2. A magnetic field can also be used for trapping or deviating the slow inelastically backscattered electrons before they reach the detectors.

I claim:

1. Apparatus for determining the degree of spin polarization of an electron beam, in which there are provided a monocrystal of electrically conducting or semiconducting material having a surface disposed perpendicularly to the radiation direction of said electron beam and formed parallel to a crystal structure plane designed to scatter the electrons of said beam, and also means for measuring the intensity of backscattering of electrons by the monocrystal in two respective directions at complementary angles to said radiation direction of said beam, having the improvement consisting in that:

(a) first means for accelerating or decelerating electrons, consisting of a plurality of electron lens elements of tubular or of diaphragm form at different electrical potentials are provided for accelerating or decelerating the electrons of said beam to velocities suitable for monochromatizing said electrom beam to a degree required in a subsequent stage;

(b) monochromatizing means downstream of said first accelerating or decelerating means are provided for monochromatizing said electron beam;

(c) second means for accelerating or decelerating electrons, consisting of electron lenses of tubular or diaphragm form, are provided and located downstream of said monochromatizing means for adjusting the energy to a value required for the scattering of the electrons of the monochromatized beam and for focussing the beam on said surface of said monocrystal;

(d) said monocrystal is arranged next in line downstream of said second accelerating or decelerating means;

(e) said means for measuring electron backscattering intensity consists essentially of at least one pair of detectors for measuring the intensity of electron beams backscattered at complementary angles from said surface of said monocrystal, and (f) means interposed between said surface of said monocrystal and said backscattering intensity measuring means are provided for separating or deviating the low-energy portion of the backscattered electrons produced by inelastic interaction of electrons of said beam with said monocrystal.

2. Apparatus for determining the degree of spin polarization of an electron beam as defined in claim 1, in which said means for separating or deviating the low-energy portion of the backscattered electrons produced by inelastic interaction of electrons of said beam with said monocrystal is constituted so as to provide an opposing electric field for repelling low-energy electrons.

3. Apparatus for determining the degree of spin polarization of an electron beam as defined in claim 1, in which said means for separating or deviating the low-energy portion of the backscattered electrons produced by inelastic interaction of electrons of said beam with said monocrystal is constituted so as to provide a field in front of each of said detectors for deviating the low-energy electrons away from said detectors.

4. Apparatus for determining the degree of spin polarization of an electron beam as defined in claim 1, in which said means for measuring electron backscattering intensity consists of four of said detectors adjustable for detecting backscattered electron beams, which detectors are disposed in pairs in two planes intersecting each other in the direction of the electron beam incident upon said monocrystal that are as nearly as possible perpendicular to each other.

5. Apparatus for determining the degree of spin polarization of an electron beam as defined in claim 1, in which said detectors of said means for measuring electron backscattering intensity are constituted as collector plates disposed in the hemispherical space above said monocrystal facing towards the arriving electron beam.

6. Apparatus for determining the degree of spin polarization of an electron beam as defined in claim 5, in which there are disposed electron multiplier channel plates in front of said collector plates.

* * * * *